US011490101B2

(12) United States Patent
Minami

(10) Patent No.: US 11,490,101 B2
(45) Date of Patent: Nov. 1, 2022

(54) VIDEO SIGNAL COMPRESSION PROCESSOR, VIDEO SIGNAL DECOMPRESSION PROCESSOR, VIDEO SIGNAL TRANSMISSION SYSTEM, METHOD OF COMPRESSING VIDEO SIGNAL, AND METHOD OF DECOMPRESSING VIDEO SIGNAL

(71) Applicant: Shimadzu Corporation, Kyoto (JP)

(72) Inventor: Hidekazu Minami, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 230 days.

(21) Appl. No.: 16/458,943

(22) Filed: Jul. 1, 2019

(65) Prior Publication Data

US 2020/0014941 A1 Jan. 9, 2020

(30) Foreign Application Priority Data

Jul. 4, 2018 (JP) .............................. JP2018-127262

(51) Int. Cl.
*H04N 19/20* (2014.01)
*G06F 3/14* (2006.01)
*H04N 19/85* (2014.01)

(52) U.S. Cl.
CPC ............... *H04N 19/20* (2014.11); *G06F 3/14* (2013.01); *H04N 19/85* (2014.11)

(58) Field of Classification Search
None
See application file for complete search history.

(56) References Cited

U.S. PATENT DOCUMENTS

| 5,179,528 A * | 1/1993 | Robertson | G06T 9/001 |
| | | | 708/203 |
| 2005/0244060 A1* | 11/2005 | Nagarajan | H04N 1/41 |
| | | | 382/302 |
| 2007/0092004 A1* | 4/2007 | Ho | H04N 19/423 |
| | | | 375/240.26 |

(Continued)

FOREIGN PATENT DOCUMENTS

| JP | H07303613 A | 11/1995 |
| JP | 2005-287927 A | 10/2005 |

(Continued)

OTHER PUBLICATIONS

First Office Action, dated Nov. 19, 2021, issued by the Chinese Patent Office for corresponding Application CN 201910566256 A (with English-language machine translation) (21 pages).

(Continued)

*Primary Examiner* — Kaitlin A Retallick
(74) *Attorney, Agent, or Firm* — Muir Patent Law, PLLC

(57) ABSTRACT

It is configured to include a video signal compression unit that compresses a video signal for displaying, on an image inspection monitor, an image inspection screen including a first area for displaying a medical image and a second area for displaying information other than the medical image, and a transmitting unit that transmits, via a communication network, the video signal having been compressed, and the video signal compression unit compresses, in each frame of the video signal, the second area of the image inspection screen at a compression rate higher than a compression rate of the first area.

10 Claims, 8 Drawing Sheets

(56) References Cited

U.S. PATENT DOCUMENTS

2007/0140575 A1* 6/2007 Bai .................. H04N 19/30
375/E7.229

FOREIGN PATENT DOCUMENTS

JP  2005287927 A  * 10/2005
JP  2014220629 A    11/2014

OTHER PUBLICATIONS

Notice of Reasons for Refusal, dated Oct. 12, 2021, issued by the Japanese Patent Office for corresponding Application JP2018127262A (with English-language machine translation) (8 pages).
Second Office Action, dated May 19, 2022, issued by the Chinese Patent Office for corresponding Application CN 201910566256 A (with English-language machine translation).

* cited by examiner

VIDEO SIGNAL COMPRESSION PROCESSOR, VIDEO SIGNAL DECOMPRESSION PROCESSOR, VIDEO SIGNAL TRANSMISSION SYSTEM, METHOD OF COMPRESSING VIDEO SIGNAL, AND METHOD OF DECOMPRESSING VIDEO SIGNAL

INCORPORATION BY REFERENCE

The present application claims priority under 35 U.S.C. § 119 to Japanese Patent Application No. 2018-127262 filed on Jul. 4, 2018, the content of this application being incorporated herein by reference in its entirety.

BACKGROUND

Technical Field

The present invention relates to a signal processing technique of a video signal for displaying, on a display device, a display screen including a medical image.

Related Art

In the medical field, as IT has become widespread, there has been widely used a medical image system that transmits, via a communication network such as a local area network (LAN), a medical image captured by a medical imaging apparatus (also referred to as modality or medical image equipment) and performs storing, management, and the like of the medical image. In this type of medical image system, a medical image is transmitted in a compressed state to reduce a communication load on the communication network. In addition, various techniques for increasing a compression rate of a medical image have been conventionally proposed (e.g., see JP 2005-287927 A).

Meanwhile, in an operation room where a medical radiographer or the like operates a medical imaging apparatus, what is called an image inspection terminal for inspecting images is generally installed to confirm whether the medical image captured by the medical imaging apparatus can be used for image interpretation. The image inspection terminal displays, on a display device, a display screen including the medical image, and a medical radiographer, a doctor, or the like visually observes the screen to inspect the image.

SUMMARY

Here, when it is considered to display, a display screen same as the display screen displayed on the display device in the operation room, on a display device installed in another room such as an image interpretation room, a signal same as a video signal input to the display device in the operation room needs to be transmitted to a display device in an image interpretation room or the like via a communication network.

However, according to conventional techniques such as JP 2005-287927 A, although data volume of the medical image at the time of transmitting and receiving the medical image is reduced, data volume of the video signal at the time of transmitting, via the communication network, the video signal to be input to the display device is not reduced. For that reason, according to the conventional techniques, it has been difficult to appropriately transmit, via the communication network, the video signal of the display screen including the medical image.

An object of the present invention is to provide a video signal compression processor, a video signal decompression processor, a video signal transmission system, a method of compressing a video signal, and a method of decompressing a video signal capable of appropriately transmitting, via a communication network, a video signal of a display screen including a medical image.

According to a first aspect of the present invention, there is provided a video signal compression processor, including: a video signal compression unit that compresses a video signal for displaying, on a display device, a display screen including a first area for displaying a medical image captured by a medical imaging apparatus and a second area for displaying information other than the medical image; and a transmitting unit that transmits, via a communication network, the video signal having been compressed, in which the video signal compression unit compresses, in each frame of the video signal, the second area of the display screen at a compression rate higher than a compression rate of compression performed on the first area.

According to a second aspect of the present invention, in the first aspect of the present invention, the video signal compression unit compresses, in each frame of the video signal, the first area of the display screen using a lossless compression scheme, and compresses the second area using a lossy compression scheme with a compression rate higher than a compression rate of the lossless compression scheme.

According to a third aspect of the present invention, in the first or second aspect of the present invention, each frame of the video signal is a signal having binary data of a predetermined bit length in which each pixel indicates a plurality of colors, and the video signal compression unit converts, in each frame of the video signal, the binary data of each pixel in the first area of the display screen into grayscale of a bit length smaller than the predetermined bit length.

According to a fourth aspect of the present invention, in the third aspect of the present invention, the video signal compression unit converts, in each frame of the video signal, the first area of the display screen into the grayscale, and then compresses the first area.

According to a fifth aspect of the present invention, in any one of the first to fourth aspects of the present invention, the video signal compression unit discriminates the first area of the display screen on the basis of a color indicated by a pixel in each frame of the video signal.

According to a sixth aspect of the present invention, in any one of the first to fifth aspects of the present invention, a signal acquisition unit that obtains an audio signal output by an output source of the video signal is included, and the transmitting unit transmits the audio signal to a transmission destination of the video signal having been compressed.

According to a seventh aspect of the present invention, in any one of the first to sixth aspects of the present invention, a receiving unit that receives, via the communication network, an input device signal output from an input device, and a signal output unit that outputs the input device signal having been received to an output source of the video signal are included.

According to an eighth aspect of the present invention, there is provided a video signal decompression processor, including: a video signal decompression unit that decompresses the video signal transmitted by the video signal compression processor according to any one of the first to seventh aspects of the present invention; and a video signal output unit that outputs, to the display device, the video signal having been decompressed.

According to a ninth aspect of the present invention, there is provided a video signal transmission system, including: a first medical imaging apparatus that includes a video signal compression unit for compressing a video signal for displaying, on a display device, a display screen including a first area for displaying a medical image captured by a medical imaging apparatus and a second area for displaying information other than the medical image, and a transmitting unit for transmitting, via a communication network, the video signal having been compressed; and a second medical imaging apparatus that includes a video signal decompression unit for decompressing the video signal transmitted by the first medical imaging apparatus, and a video signal output unit for outputting, to the display device, the video signal having been decompressed, in which the video signal compression unit of the first medical imaging apparatus compresses, in each frame of the video signal, the second area of the display screen at a compression rate higher than a compression rate of compression performed on the first area.

According to a tenth aspect of the present invention, there is provided a method of compressing a video signal, including: a first step of compressing a video signal for displaying, on a display device, a display screen including a first area for displaying a medical image captured by a medical imaging apparatus and a second area for displaying information other than the medical image; and a second step of outputting the video signal having been compressed, in which in the first step, the second area of the display screen in each frame of the video signal is compressed at a compression rate higher than a compression rate of compression performed on the first area.

According to an eleventh aspect of the present invention, there is provided a method of decompressing a video signal, including: a step of decompressing a video signal having been compressed using the method of compressing a video signal according to the tenth aspect of the present invention; and a step of outputting the video signal having been decompressed to a display device.

According to the first aspect of the present invention, in each frame of the video signal, the second area of the display screen is compressed at a compression rate higher than the compression rate of the compression performed on the first area. As a result, the compression rate of the frame of the video signal can be enhanced while loss of information and deterioration in visibility due to the compression in the first area for displaying the medical image are suppressed, thereby reducing data volume of the video signal transmitted from the transmitting unit. The video signal can be thus appropriately transmitted via the communication network while a communication load is suppressed.

According to the second aspect of the present invention, the second area is compressed using the lossy compression scheme with the compression rate higher than that of the lossless compression scheme, whereby the compression rate can be enhanced compared with the compression of the frame using only the lossless compression scheme, and the data volume can be reduced while loss of information and deterioration in visibility due to the compression do not occur in the first area for displaying the medical image.

According to the third aspect of the present invention, the binary data of each pixel of the first area is converted into grayscale of a bit length smaller than the predetermined bit length, whereby the data volume of the frame can be further reduced.

According to the fourth aspect of the present invention, the first area is converted into the grayscale and then the first area is compressed, whereby the first area in the frame can be easily discriminated by extracting the pixel converted into the grayscale. Accordingly, it is not necessary to separately record information defining the range of the first area.

According to the fifth aspect of the present invention, the first area of the display screen is discriminated on the basis of color indicated by a pixel in each frame, whereby the range of the medical image of the grayscale can be easily and reliably discriminated without fail.

According to the sixth aspect of the present invention, the audio signal is transmitted to the transmission destination of the video signal, whereby sound as well as video including the medical image can be transmitted to the transmission destination.

According to the seventh aspect of the present invention, the input device signal received via the communication network is output to the output source of the video signal, whereby a user or the like can give, using the input device, an instruction or information to the output source via the communication network.

According to the eighth aspect of the present invention, the video signal having been compressed is decompressed, and the video signal having been decompressed is output to the display device. Accordingly, the display screen based on the video signal can be displayed on the display device without causing loss of information or deterioration in visibility in the first area for displaying the medical image.

The ninth aspect of the present invention exerts effects similar to those of the first and eighth aspects of the present invention.

The tenth aspect of the present invention exerts an effect similar to that of the first aspect of the present invention.

The eleventh aspect of the present invention exerts an effect similar to that of the eighth aspect of the present invention.

DETAILED DESCRIPTION

Hereinafter, an embodiment of the present invention will be described with reference to the accompanying drawings.

Figure 1:
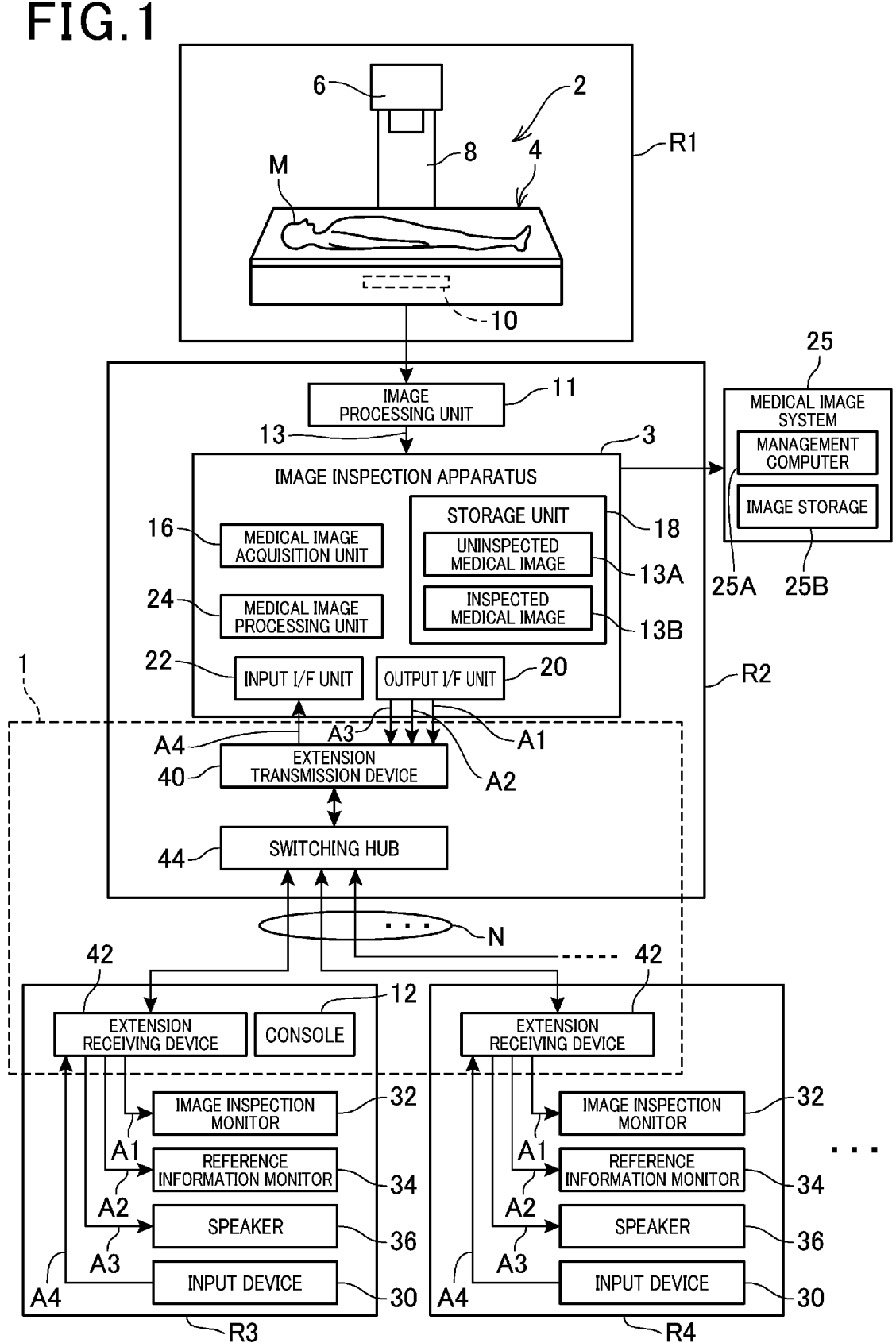
FIG. 1 is a diagram illustrating a configuration of a video signal transmission system according to an embodiment of the present invention.

FIG. 1 is a diagram illustrating a configuration of a video signal transmission system 1 according to the present embodiment.

The video signal transmission system 1 is provided in a medical facility in which an X-ray fluoroscopic imaging apparatus 2 and an image inspection apparatus 3 are installed, which is a system for transmitting, via a communication network N such as a LAN, video signals A1 and A2 output from the image inspection apparatus 3.

The X-ray fluoroscopic imaging apparatus 2 is an exemplary medical imaging apparatus (also referred to as medical image equipment) that captures a medical image 13 of a human body, which is installed in an examination room R1 and performs X-ray fluoroscopic imaging on a subject M. The X-ray fluoroscopic imaging apparatus 2 according to the present embodiment includes a bed part 4 on which the subject M in a lying posture is placed, an X-ray tube 6 that irradiates the subject M with X-rays, a support column 8 that supports the X-ray tube 6 above the bed part 4, and an X-ray detector 10 that detects the X-ray having passed though the subject M and outputs an X-ray detection signal. A flat panel detector (FPD), an image intensifier (I. I.), or the like is used for the X-ray detector 10. The X-ray tube 6 and the X-ray detector 10 are provided to be capable of reciprocating along the bed part 4 using a moving drive mechanism including a linear guide, a motor, and the like. A console 12 with which a radiographer operates the X-ray fluoroscopic imaging apparatus 2 is disposed in an operation room R3. In addition, an image processing unit 11 that sequentially generates medical images 13 of a predetermined format on the basis of the X-ray detection signal of the X-ray fluoroscopic imaging apparatus 2 is disposed in a machine room R2. The image processing unit 11 includes, for example, a computer including a processor such as a central processing unit (CPU), a microprocessor unit (MPU), and a graphics processing unit (GPU), and sequentially generates the medical images 13 to output them in chronological order with one medical image 13 being set as one frame, thereby outputting a dynamic image of the medical image 13.

In the present embodiment, the medical image 13 uses a format defined by the DICOM standard. The image processing unit 11 generates the medical image 13 in a non-compressed state in which binary data of each pixel is in a grayscale format of a predetermined bit length (e.g., 10 to 12 bits).

The image inspection apparatus 3 is installed in the machine room R2, which is an apparatus that allows a medical radiographer, a doctor, or the like to visually check if the medical image 13 can be used for image interpretation and allows the medical radiographer, the doctor, or the like to execute image processing on the medical image 13 as necessary. Hereinafter, the medical radiographer, the doctor, and the like who use the image inspection apparatus 3 will be referred to as a "user".

The image inspection apparatus 3 according to the present embodiment includes a medical image acquisition unit 16, a storage unit 18, an output I/F unit 20, an input I/F unit 22, and a medical image processing unit 24.

The image inspection apparatus 3 according to the present embodiment is composed of a computer including a processor such as a CPU and an MPU, a memory device such as a read-only memory (ROM) and a random access memory (RAM), a storage device such as a hard disk drive (HDD) and a solid state drive (SSD), an image processor for executing various kinds of image processing and generation of a graphical user interface (GUI) screen that is a display screen, and an interface circuit for connecting a peripheral device.

The storage device stores an application program for image inspection, and the processor executes the application program to implement various functions for image inspection. When the application program is executed, the image processor generates the display screen (GUI screen) provided by the application program.

The medical image acquisition unit 16 obtains, from the image processing unit 11 of the X-ray fluoroscopic imaging apparatus 2a, dynamic image of the medical image 13 captured by the X-ray fluoroscopic imaging apparatus 2.

The storage unit 18 is for storing medical image 13, and stores an uninspected medical image 13A, which is a medical image 13 before image inspection, and an inspected medical image 13B, which is a medical image 13 after image inspection. Note that the storage unit 18 may store the medical image 13 in a multi-frame format, thereby storing a dynamic image of the medical image 13.

The output I/F unit 20 outputs the video signal A1 for displaying an image inspection screen 50 (see FIG. 2), which is a display screen for allowing the user to perform image inspection on the uninspected medical image 13A, on an image inspection monitor 32. In addition, the output I/F unit 20 outputs the video signal A2 for displaying a reference information screen, which is a display screen for allowing the user to browse reference information linked to the uninspected medical image 13A, such as the inspected medical image 13B and information associated with the subject M, on a reference information monitor 34. The output I/F unit 20 further outputs an audio signal A3 of various types of sound. The sound includes, for example, a sound input from the X-ray fluoroscopic imaging apparatus 2, in addition to various types of sound such as an operation sound and a warning sound generated by the image inspection apparatus 3.

The input I/F unit 22 receives an input device signal A4 output from an input device 30. The input device 30 is a device for inputting an instruction or information to the image inspection apparatus 3, and those instruction and the information output the input device signal A4. Examples of the input device 30 include devices such as a keyboard, a mouse, and a recording medium reader (DVD drive, etc.).

The medical image processing unit 24 performs image processing on the uninspected medical image 13A displayed on the image inspection screen 50 in accordance with the image processing instruction from the user input via the input I/F unit 22. The image processing includes image correction, rotation at an arbitrary angle, filter processing such as a density change and a gradation change, scaling processing of a designated area, and the like. When the user inputs an image inspection confirming instruction via the input I/F unit 22, the medical image processing unit 24 stores, in the storage unit 18, the medical image 13 having been subject to the image processing, as the inspected medical image 13B.

The inspected medical image 13B is output from the image inspection apparatus 3 to a medical image system 25 such as a picture archiving and communication system (PACS), stored in an image storage 25B included in the medical image system 25, and managed by a management computer 25A included in the medical image system 25. An appropriate path, such as the communication network N, is used as a transmission path of the inspected medical image 13B from the image inspection apparatus 3 to the medical image system 25.

In the medical facility according to the present embodiment, the image inspection monitor 32 and the reference information monitor 34 are disposed in the operation room R3 and an image interpretation room R4, which are rooms different from the machine room R2. Monitors such as a high-definition cathode-ray tube (CRT) and a flat panel display suitable for image inspection and image interpretation are used as the image inspection monitor 32 and the reference information monitor 34. The video signal transmission system 1 transmits the video signals A1 and A2 of the image inspection apparatus 3 to those image inspection monitor 32 and the reference information monitor 34 via the communication network N.

The video signal transmission system 1 includes an extension transmission device 40, a plurality of extension receiving devices 42, and a switching hub 44.

The extension transmission device 40 is a transmission device that transmits the video signals A1 and A2 and the audio signal A3 output from the image inspection apparatus 3 via the communication network N, and is installed in the machine room R2 same as the image inspection apparatus 3.

Meanwhile, the extension receiving device 42 is a receiving device that receives the video signals A1 and A2 and the audio signal A3 transmitted from the extension transmission device 40 and outputs them to the image inspection monitor 32, the reference information monitor 34, and a speaker 36, and is installed in each of the operation room R3 and the image interpretation room R4.

Accordingly, a plurality of users can perform image inspection on the uninspected medical image 13A while visually observing the same image inspection screen 50 and the reference information screen in each of the operation room R3 and the image interpretation room R4 and also listening to the same sound output from the image inspection apparatus 3 and the X-ray fluoroscopic imaging apparatus 2.

Furthermore, the extension receiving device 42 according to the present embodiment has a function of receiving the input device signal A4 of the input device 30 and transmitting it to the extension transmission device 40 via the communication network N, and the extension transmission device 40 has a function of outputting the received input device signal A4 to the image inspection apparatus 3. Accordingly, the plurality of users can perform operation on the same image inspection screen 50 and the reference information screen in each of the operation room R3 and the image interpretation room R4.

The switching hub 44 is what is called a line concentrator that connects one extension transmission device 40 and the plurality of extension receiving devices 42 via the communication network N. Note that, in the case where the video signal transmission system 1 includes one extension receiving device 42, the switching hub 44 does not necessarily have to be provided.

Figure 2:
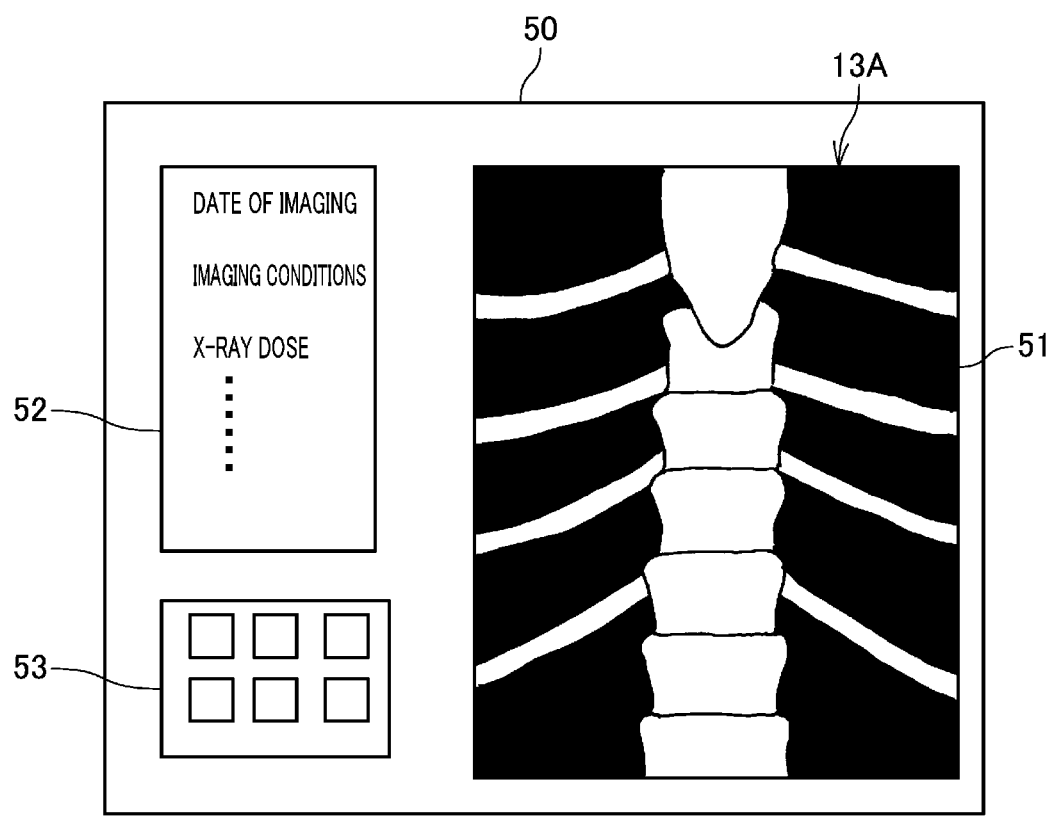
FIG. 2 is a schematic diagram illustrating an exemplary image inspection screen.

FIG. 2 is a schematic diagram illustrating an example of the image inspection screen 50.

The image inspection screen 50 is a display screen generated by execution of the application program for image inspection in the image inspection apparatus 3. The image inspection screen 50 according to the present embodiment includes a medical image display area 51, an information display area 52, and an operation panel display area 53.

The medical image display area 51 is an area for displaying the uninspected medical image 13A. In the present embodiment, a dynamic image of the uninspected medical image 13A is displayed in the medical image display area 51.

Unlike the medical image display area 51, the information display area 52 and the operation panel display area 53 are areas for displaying information other than the medical image 13 such as the uninspected medical image 13A.

Specifically, the information display area 52 is an area for displaying various kinds of information associated with the medical image 13. Examples of the information include attribute information of the subject M, and X-ray fluoroscopic imaging information. The attribute information of the subject M is information including, for example, gender, age, height, weight, medical history, and the like, and the X-ray fluoroscopic imaging information is information including the date of imaging, a name of the used medical imaging apparatus, imaging conditions at the time of performing X-ray fluoroscopic imaging, an X-ray dose (radiation dose), and the like.

The operation panel display area 53 is an area for displaying various buttons and input fields for operating the image inspection screen 50. For example, a plurality of operation icons for giving instructions regarding various kinds of image processing on the uninspected medical image 13A is displayed in the operation panel display area 53.

A signal standard capable of digitally transmitting screen data is used for the video signal A1 for displaying the image inspection screen 50. Examples of the signal standard include a digital visual interface (DVI) and a high-definition multimedia interface (HDMI) (registered trademark), and the DVI format is used in the present embodiment. In a similar manner to the video signal A1, the DVI format is also used for the video signal A2 for displaying the reference information screen.

According to the DVI format, one frame includes image data having, for each pixel, 24-bit binary data in which 8 bits are allocated to each RGB color, and a large number of frames are sequentially transmitted at a predetermined frame rate. A transmission rate is determined on the basis of the number of pixels included in one frame and the frame rate, and according to the DVI format, a transmission rate exceeding several Gbps (giga-bit per second) can be achieved. In the present embodiment, the image inspection apparatus 3 outputs each of the video signals A1 and A2 to the video signal transmission system 1 at a transmission rate of 1.8 Gbps.

The video signal transmission system 1 transmits the video signals A1 and A2 via the communication network N in accordance with a predetermined video transmission standard, and in the present embodiment, GigE Vision (registered trademark) is used as the video transmission standard. This video transmission standard is a standard that enables transmission of the video signals A1 and A2 over a wide range through Ethernet (registered trademark) (IEEE802.3) that is one of communication standards, which enables transmission of the video signals A1 and A2 at a transmission rate of 1 Gbps using a standard Ethernet cable.

In the present embodiment, a network according to Ethernet is used for the communication network N to use this video transmission standard, and a cable capable of transmitting a signal at a transmission rate at least equal to or more than that of the video transmission standard (1 Gbps in the present embodiment) is used for a communication cable of the communication network N.

Here, as described above, the transmission rate of the video signals A1 and A2 output from the image inspection apparatus 3 is about 3.6 Gbps in total, which reaches several times the transmission rate (1 Gbps) of the video transmission standard. Therefore, when those video signals A1 and A2 are directly output to the communication network N, loss and delay of the video signals A1 and A2 are significantly caused on the receiving side.

In view of the above, in the video signal transmission system 1, the extension transmission device 40 on the transmission side functions as a video signal compression processor that compresses the video signals A1 and A2 to reduce the data volume during transmission, which enables transmission of the video signals A1 and A2 via the communication network N at a transmission rate conforming to the video transmission standard.

Moreover, the extension receiving device 42 on the receiving side functions as a video signal decompression processor that decompresses the compression of the video signals A1 and A2 to restore the video signals A1 and A2 in the DVI format, and the image inspection screen 50 and the reference information screen are displayed on the image inspection monitor 32 and the reference information monitor 34.

Hereinafter, each of the extension transmission device 40 and the extension receiving device 42 will be described in detail.

Figure 3:
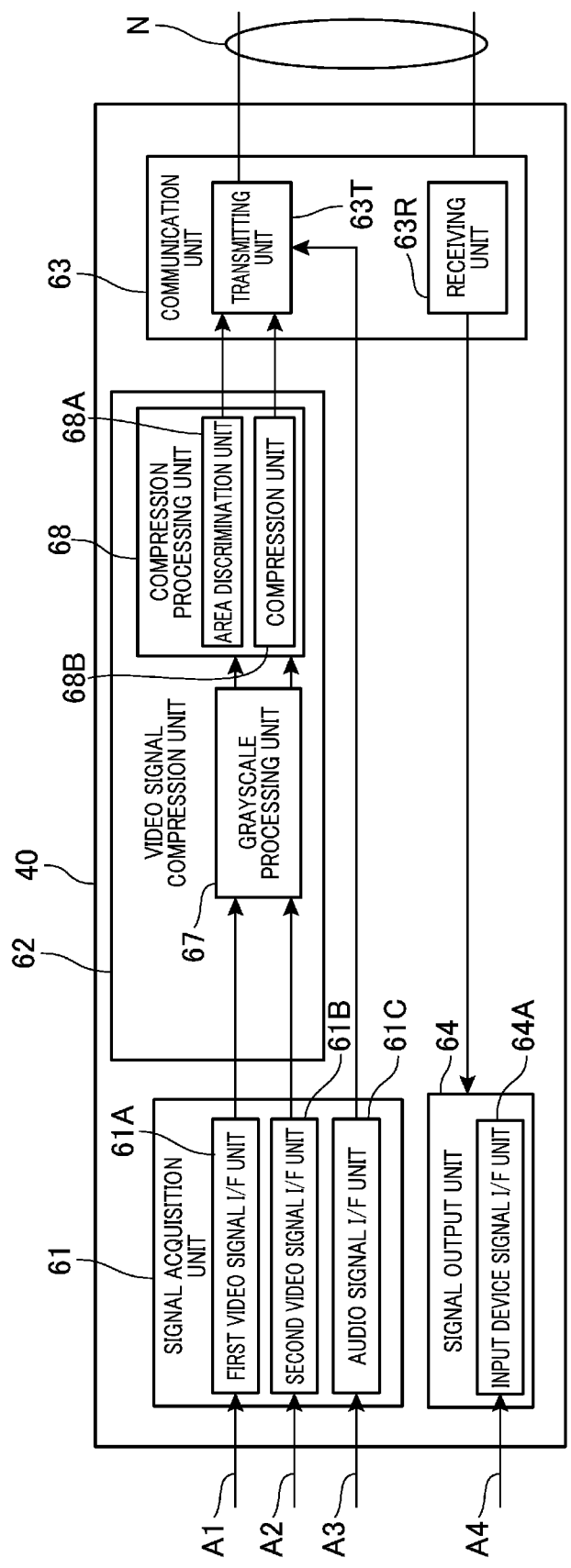
FIG. 3 is a block diagram illustrating a functional configuration of an extension transmission device.

FIG. 3 is a block diagram illustrating a functional configuration of the extension transmission device 40.

The extension transmission device 40 includes a signal acquisition unit 61, a video signal compression unit 62, a communication unit 63, and a signal output unit 64.

The extension transmission device 40 includes a substrate on which an interface circuit for inputting and outputting various signals, a processor circuit such as a CPU and an MPU, and a communication circuit including a transmitter and a receiver for transmitting and receiving signals in accordance with the communication standard mentioned above are mounted, and respective functional units in FIG. 3 are implemented by the respective circuits of the substrate.

The signal acquisition unit 61 obtains the video signals A1 and A2 and the audio signal A3 output from the image inspection apparatus 3, outputs the video signals A1 and A2 to the video signal compression unit 62, and outputs the audio signal A3 to the communication unit 63. Specifically, the signal acquisition unit 61 includes a first video signal I/F unit 61A that receives input of the video signal A1 and outputs it to the video signal compression unit 62, a second video signal I/F unit 61B that receives input of the video signal A2 and outputs it to the video signal compression unit 62, and an audio signal I/F unit 61C that receives input of the audio signal A3 and outputs it to the communication unit 63.

The video signal compression unit 62 compresses the video signals A1 and A2, and outputs them to the communication unit 63 in the state where the data volume is reduced. This compression will be described later.

The communication unit 63 is for transmitting and receiving signals via the communication network N in accordance with the predetermined communication standard mentioned above, and includes a transmitting unit 63T, and a receiving unit 63R.

The transmitting unit 63T converts the video signals A1 and A2 having been compressed and the audio signal A3 into transmission signals of a format defined by the predetermined communication standard mentioned above, and outputs the transmission signals to the communication network N.

The receiving unit 63R receives a reception signal of a format defined by the predetermined communication standard mentioned above from the communication network N, and decodes the reception signal. Examples of the signal to be received include the input device signal A4.

The signal output unit 64 includes an input device I/F unit 64A, and the input device I/F unit 64A outputs the input device signal A4 received by the receiving unit 63R to the image inspection apparatus 3.

Figure 4:
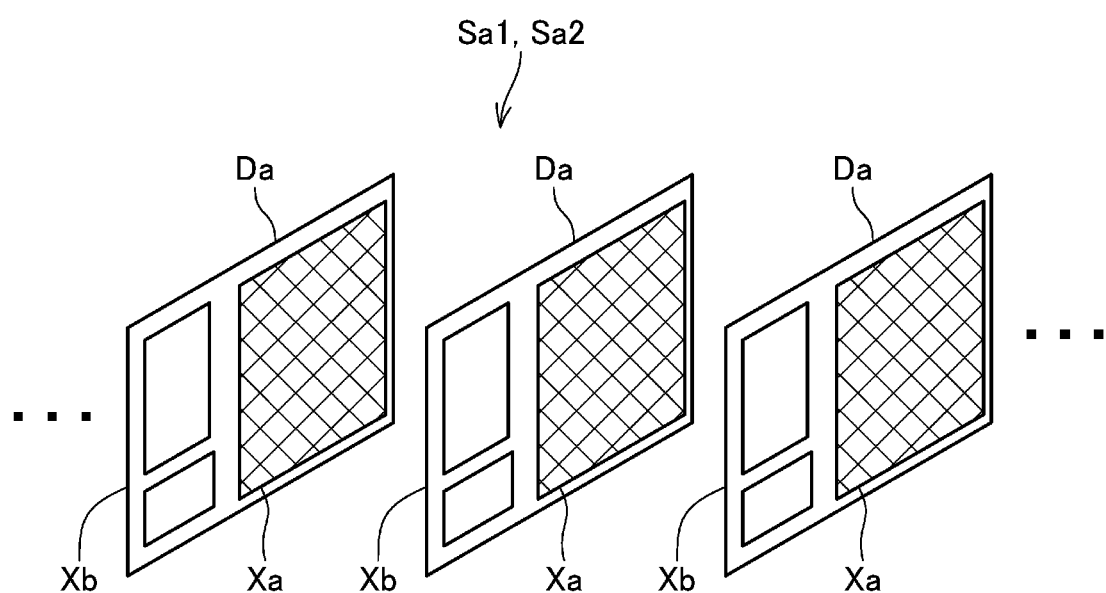
FIG. 4 is an explanatory diagram of a frame in a video signal.

As illustrated in FIG. 4, the video signal compression unit 62 mentioned above compresses each of frames Da with respect to the video signals A1 and A2 in which individual frames Da are arranged at a predetermined frame rate, thereby reducing the data volume. As illustrated in FIG. 3, the video signal compression unit 62 according to the present embodiment includes a grayscale processing unit 67 and a compression processing unit 68 to compress the frame Da. The video signal compression unit 62 is implemented by a processor mounted on the substrate, and a RAM that functions as a frame buffer memory.

As described above, the frame Da of the video signals A1 and A2 in the DVI format is an image in a 24-bit full color format, and in the present embodiment, as illustrated in FIG. 4, each frame Da includes the uninspected medical image 13A or the inspected medical image 13B, that is, both of a first area Xa for displaying the medical image 13 and a second area Xb for displaying information other than the medical image 13 (i.e., area other than the first area Xa). In the image inspection screen 50, the medical image display area 51 corresponds to the first area Xa, and all areas other than the medical image display area 51 in the image inspection screen 50, which includes the information display area 52 and the operation panel display area 53, correspond to the second area Xb.

The grayscale processing unit 67 converts in the frame Da, the binary data of each pixel of the first area Xa from the 24-bit full color in which 8 bits are allocated to each RGB color into 8-bit grayscale indicating only gradation (brightness) of a pixel. Accordingly, the first area Xa of the frame Da is gray-scaled.

The compression processing unit 68 compresses the frame Da using both of two compression schemes having different compression rates, thereby reducing the data volume of the frame Da. In the present embodiment, a lossless compression scheme and a lossy compression scheme are used as those compression schemes.

The lossless compression scheme is a compression scheme capable of restoring the compressed frame Da to a state before being compressed, and for example, JPEG-LS is used as the lossless compression scheme.

The lossy compression scheme is a compression scheme in which the compressed frame Da is not restored to the state before being compressed and image quality is degraded, and JPEG, JPEG2000, Wavelet compression processing, or the like is used as the lossy compression scheme. In the present embodiment, compression using the lossy compression scheme is set to have a compression rate higher than that of the lossless compression scheme.

The compression processing unit 68 compresses the first area Xa using the lossless compression scheme in the frame Da, and compresses the second area Xb, which is the area other than the first area Xa, using the lossy compression scheme in which a compression rate higher than the compression rate of the compression performed on the first area Xa is set. In the present embodiment, the compression processing unit 68 includes an area discrimination unit 68A, and a compression unit 68B.

The area discrimination unit 68A discriminates the first area Xa and the second area Xb in the frame Da.

The compression unit 68B compresses the area discriminated to be the first area Xa in the frame Da using the lossless compression scheme, and compresses the area discriminated to be the second area Xb using the lossy compression scheme.

In this manner, the first area Xa for displaying the medical image 13 is compressed using the lossless compression scheme, whereby loss of information and a decrease in visibility due to the compression do not occur. In addition, the frame Da is compressed using both of the lossless compression scheme and the lossy compression scheme, whereby the compression rate of the frame Da can be enhanced compared with the case of compression using only the lossless compression scheme.

Figure 5:
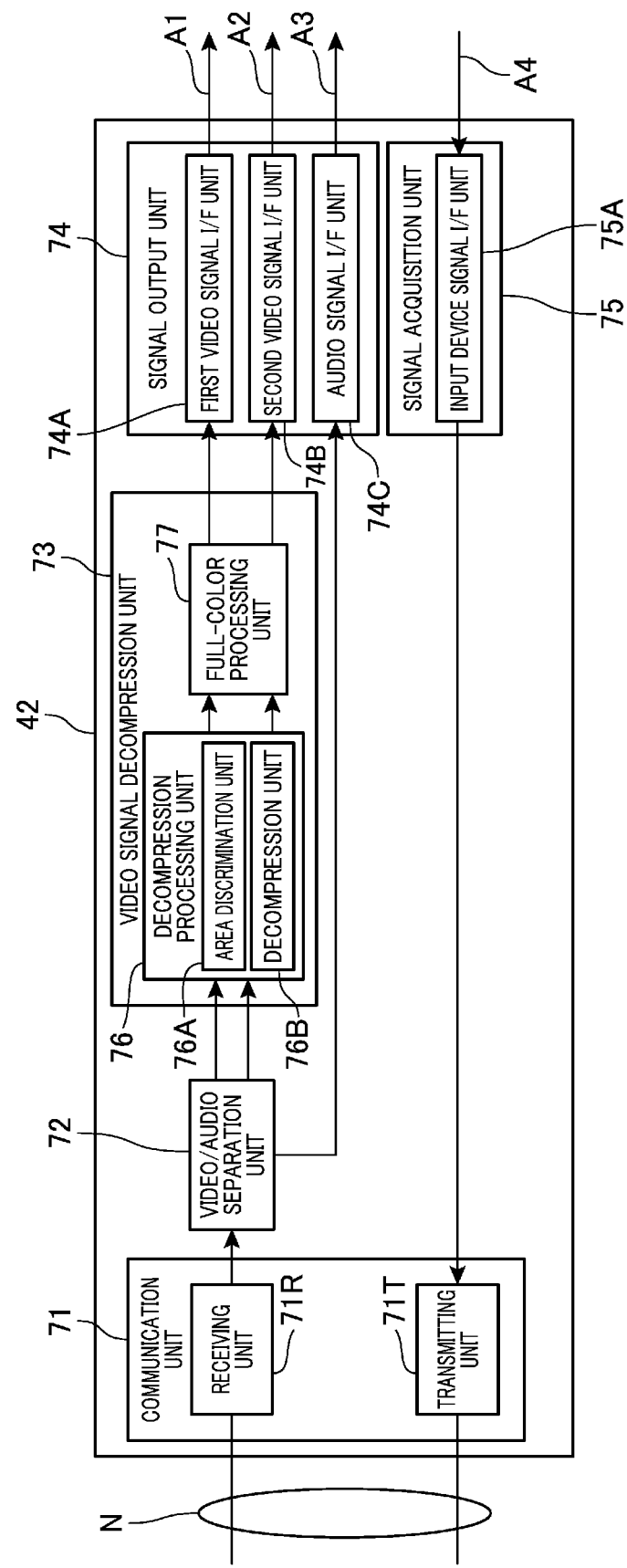
FIG. 5 is a block diagram illustrating a functional configuration of an extension receiving device.

FIG. 5 is a block diagram illustrating a functional configuration of the extension receiving device 42.

The extension receiving device 42 includes a communication unit 71, a video/audio separation unit 72, a video signal decompression unit 73, a signal output unit 74, and a signal acquisition unit 75.

The extension receiving device 42 includes a substrate on which a communication circuit including a transmitter and a receiver for transmitting and receiving signals in accordance with the communication standard same as that of the extension transmission device 40, a signal selector circuit, a processor circuit such as a CPU and an MPU, and an interface circuit for inputting and outputting various signals are mounted, and respective functional units in FIG. 5 are implemented by the respective circuits of the substrate.

The communication unit 71 is for transmitting and receiving signals via the communication network N in accordance with the predetermined communication standard mentioned above, and includes a receiving unit 71R, and a transmitting unit 71T.

The receiving unit 71R receives reception signals of a format defined by the predetermined communication standard mentioned above from the communication network N, decodes the reception signals, and outputs them to the video/audio separation unit 72. The reception signals in the present embodiment are the video signals A1 and A2 having been compressed and the audio signal A3.

The transmitting unit 71T converts the input device signal A4 of the input device 30 into a transmission signal of a format defined by the predetermined communication standard mentioned above, and outputs the transmission signal to the communication network N.

The video/audio separation unit 72 outputs, from among the signals input from the receiving unit 71R, the video signals A1 and A2 having been compressed, to the video signal decompression unit 73, and outputs the audio signal A3 to the signal output unit 74.

The video signal decompression unit 73 decompresses the compression of the video signals A1 and A2, which has been performed by the extension transmission device 40, to restore the signals into the video signals A1 and A2 in the DVI format, and outputs them to the signal output unit 74. This decompression will be described later.

The signal output unit 74 outputs the restored video signals A1 and A2 and the audio signal A3 to the image inspection monitor 32, the reference information monitor 34, and the speaker 36, respectively. That is, the signal output unit 74 includes a first video signal I/F unit 74A for outputting the video signal A1 to the image inspection monitor 32, a second video signal I/F unit 74B for outputting the video signal A2 to the reference information monitor 34, and an audio signal I/F unit 74C for outputting the audio signal A3 to the speaker 36.

The signal acquisition unit 75 includes an input device I/F unit 75A. The input device I/F unit 75A receives the input device signal A4 output from the input device 30, and outputs it to the transmitting unit 71T of the communication unit 71.

The video signal decompression unit 73 mentioned above includes a decompression processing unit 76, and a full-color processing unit 77 to decompress the compression performed by the video signal compression unit 62. The video signal decompression unit 73 is implemented by a processor mounted on the substrate, and a RAM that functions as a frame buffer memory.

The decompression processing unit 76 is for decompressing the compression performed by the compression processing unit 68 of the video signal compression unit 62, and includes an area discrimination unit 76A, and a decompression unit 76B.

The area discrimination unit 76A discriminates, in the frame Da, the first area Xa to which the lossless compression scheme is applied, and the second area Xb to which the lossy compression scheme is applied.

The decompression unit 76B decompresses, in the frame Da, the first area Xa to which the lossless compression scheme is applied, using the algorithm used for the lossless compression, thereby restoring it to the state before being compressed without loss. The decompression unit 76B decompresses the second area Xb to which the lossy compression scheme is applied, using the algorithm used for the lossy compression scheme.

The full-color processing unit 77 restores, in the frame Da, the binary data of each pixel of the first area Xa gray-scaled by the grayscale processing unit 67 of the video signal compression unit 62 to the 24-bit full color in which 8 bits are allocated to each RGB color. As a result, the entire frame Da is restored to the image in the 24-bit full color format, and the DIV signal is restored.

Next, operation of the video signal transmission system 1 will be described.

At the time of X-ray fluoroscopic imaging using the X-ray fluoroscopic imaging apparatus 2, the radiographer operates the console 12 in the operation room R3 to activate the X-ray fluoroscopic imaging apparatus 2 in the examination room R1, thereby performing X-ray fluoroscopic imaging of the subject M. As a result, a dynamic image of the medical image 13 is sequentially input from the image processing unit 11 to the image inspection apparatus 3.

In the image inspection apparatus 3, the application program for the image inspection is executed, thereby generating respective video signals A1 and A2 of the image inspection screen 50 and the reference information screen. Those video signals A1 and A2 are then output from the output I/F unit 20, the audio signal A3 is also appropriately output from the output I/F unit 20, and they are input to the extension transmission device 40 of the video signal transmission system 1.

With respect to the video signals A1 and A2, the extension transmission device 40 performs a video signal compression process to be described later on the video signals A1 and A2, and transmits the video signals A1 and A2 having been compressed and the audio signal A3 to the respective extension receiving devices 42 in the operation room R3 and the image interpretation room R4 via the communication network N.

Upon reception of the video signals A1 and A2 having been compressed and the audio signal A3 via the communication network N, the extension receiving device 42 outputs the audio signal A3 to the speaker 36, restores the video signals A1 and A2 by performing a video signal decompression process to be described later, and outputs the restored video signals A1 and A2 to the image inspection monitor 32 and the reference information monitor 34.

Moreover, when the input device signal A4 of the input device 30 is input, the extension receiving device 42 transmits it to the extension transmission device 40 via the communication network N, and the extension transmission device 40 inputs the input device signal A4 to the image inspection apparatus 3.

As a result, each user (radiographer, doctor, etc.) staying in each of the operation room R3 and the image interpretation room R4 can view the same image inspection screen 50 and the reference information screen output from the image inspection apparatus 3, on the image inspection monitor 32 and the reference information monitor 34. Furthermore, each user can operate the image inspection screen 50 and the reference information screen (i.e., image inspection apparatus 3) using the input device 30 from each of the operation room R3 and the image interpretation room R4.

Figure 6:
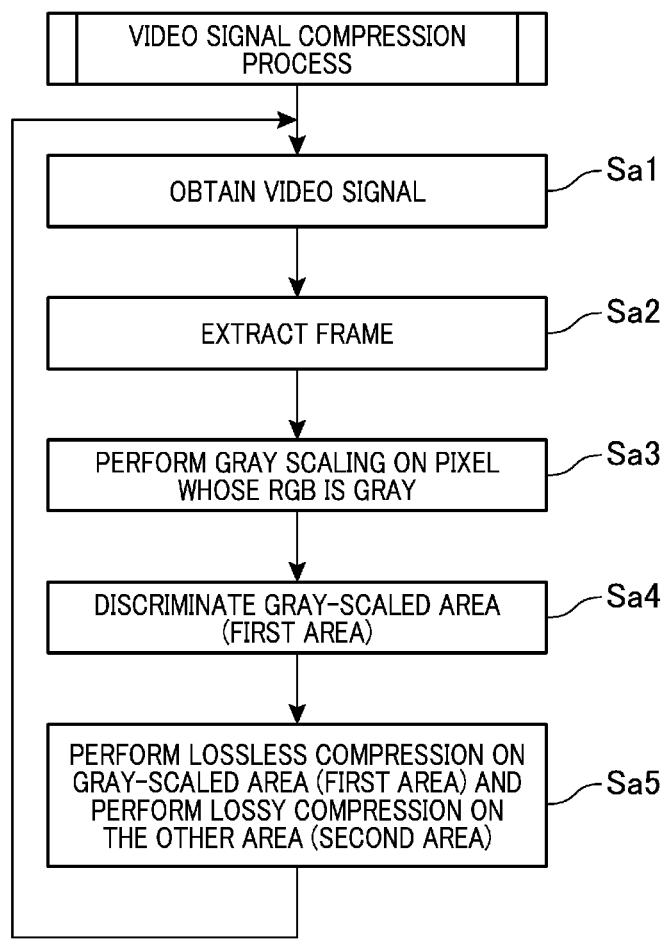
FIG. 6 is a flowchart of a video signal compression process.

FIG. 6 is a flowchart of the video signal compression process mentioned above performed by the extension transmission device 40.

When the video signals A1 and A2 are input to the signal acquisition unit 61, the extension transmission device 40 obtains those video signals A1 and A2 (step Sa1), extracts the frame Da from the video signals A1 and A2 (step Sa2), and the video signal compression unit 62 sequentially compresses each frame Da.

To describe in more detail, first, the grayscale processing unit 67 causes the first area Xa displaying the medical image 13 to be gray-scaled in the frame Da (step Sa3). Specifically, the grayscale processing unit 67 scans each pixel of the frame Da, and detects a pixel whose color indicated by the 24-bit binary data in which 8 bits are allocated to each RGB color is gray, that is, a pixel with the binary data in which all of the R value, the G value, and the B value are equal. Then, each time the grayscale processing unit 67 detects a pixel with the color of gray, the grayscale processing unit 67 converts the binary data of the pixel from the 24-bit full color into the 8-bit grayscale.

Figure 7:
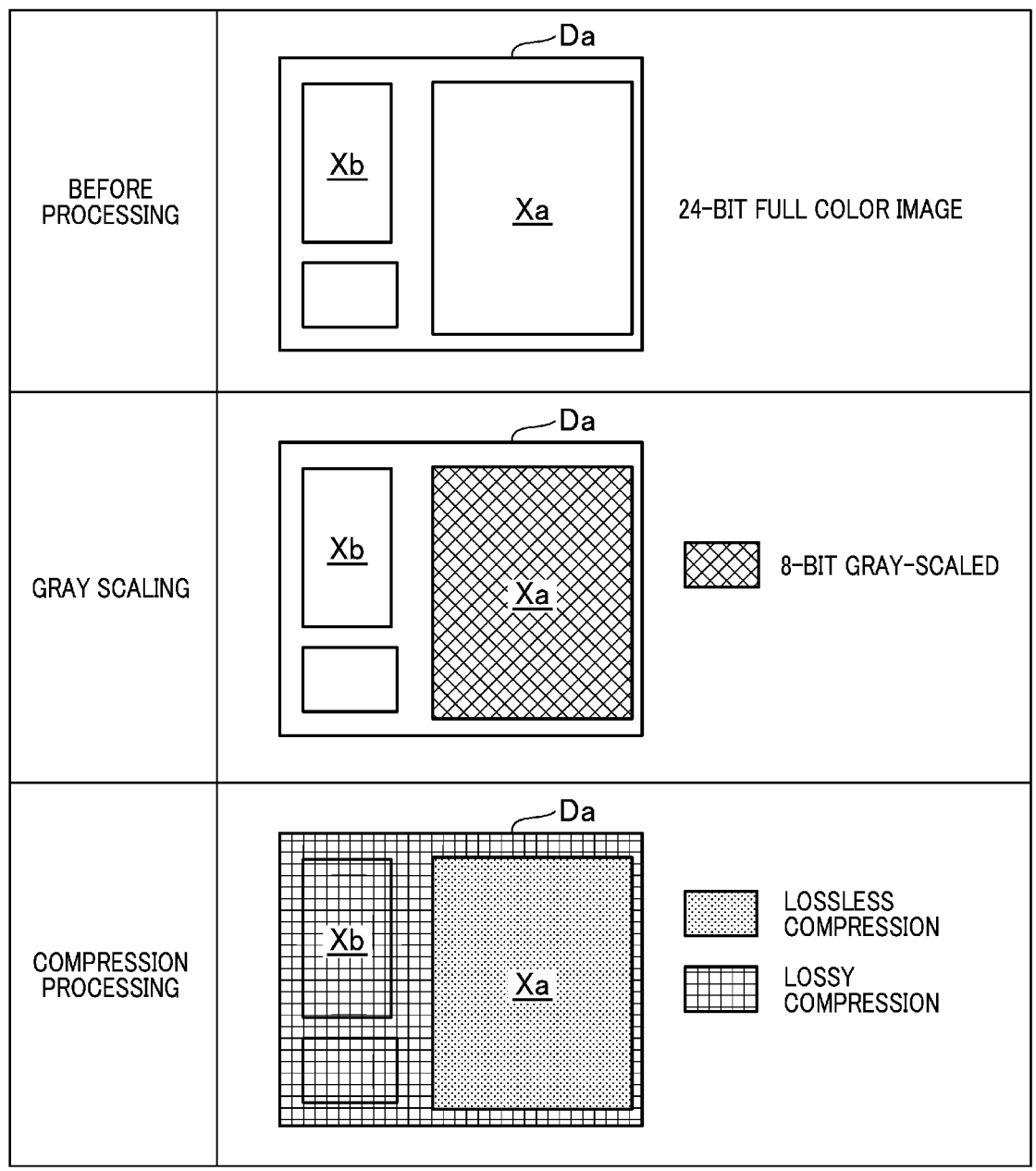
FIG. 7 is an explanatory diagram of frame compression in the video signal.

By this gray scaling, as illustrated in FIG. 7, the entire area of the first area Xa displaying the medical image 13 that is originally an image of the grayscale format is gray-scaled in the frame Da.

In other words, in the frame Da, the first area Xa is an area in which the medical image 13 originally in the grayscale format is displayed in the 24-bit full color format based on the DVI format, whereby the image quality of the frame Da (i.e., image inspection screen 50 and reference information screen) is not substantially affected even when the first area Xa is gray-scaled. In addition, by this gray scaling, the bit length of the binary data of each pixel in the first area Xa decreases from 24 bits to 8 bits, whereby the data volume of the first area Xa is reduced to one third. In particular, in the image inspection screen 50, the medical image display area 51 (FIG. 2) corresponding to the first area Xa occupies a relatively large area, whereby the data volume is effectively reduced by this gray scaling.

Returning to FIG. 6, in order to compress the gray-scaled frame Da using both of the lossless compression scheme and the lossy compression scheme, first, the area discrimination unit 68A of the compression processing unit 68 discriminates the first area Xa and the second area Xb other than the first area Xa in the frame Da (step Sa4). The first area Xa corresponds to the area gray-scaled in step Sa3 (hereinafter referred to as "gray-scaled area") and in step Sa4, this gray-scaled area is discriminated as follows. That is, the area discrimination unit 68A extracts all pixels in which the bit length of the binary data is 8 bits in the frame Da, and discriminates the gray-scaled area in the frame Da on the basis of those pixels.

Then, the compression unit 68B of the compression processing unit 68 compresses the gray-scaled area (i.e., first area Xa) in the frame Da using the lossless compression scheme, and compresses the area other than the gray-scaled area (i.e., second area Xb) using the lossy compression scheme set to a compression rate higher than that of the lossless compression scheme (step Sa5).

By this compression, as illustrated in FIG. 7, the first area Xa in the frame Da, which displays the medical image 13, is compressed using the lossless compression scheme, and the second area Xb, which is the remaining area other than the first area Xa, is compressed using the lossy compression scheme.

As a result, loss of information and deterioration in visibility due to the compression do not occur in the first area Xa displaying the medical image 13. Moreover, the second area Xb is compressed using the lossy compression scheme set to a compression rate higher than that of the lossless compression scheme, whereby the entire compression rate of the frame Da is enhanced. In addition, as described above, the data volume of the first area Xa is reduced to one third by the gray scaling, whereby the ultimate data volume of the frame Da can be made small enough even when the lossless compression scheme with a relatively small compression rate is used.

Since the data volume of the frame Da is reduced in this manner, the transmission rate of the video signals A1 and A2 having been compressed can be suppressed to equal to or less than the transmission rate permitted by the video transmission standard used for transmission in the communication network N, whereby the transmission is performed toward the receiving side without causing a delay or the like at the time of transmission. As a result, the image inspection screen 50 and the reference information screen of the video signals A1 and A2 output at the same timing can be viewed substantially simultaneously in the respective operation room R3 and the image interpretation room R4, whereby a shift in the display timing between the operation room R3 and the image interpretation room R4 can also be suppressed.

The extension transmission device 40 repeatedly executes the processing of steps Sa1 to Sa5 as long as the video signals A1 and A2 are input. Then, for example, when the execution of the application for image inspection ends in the image inspection apparatus 3 and the input of the video signals A1 and A2 stops, the video signal compression process is terminated.

Figure 8:
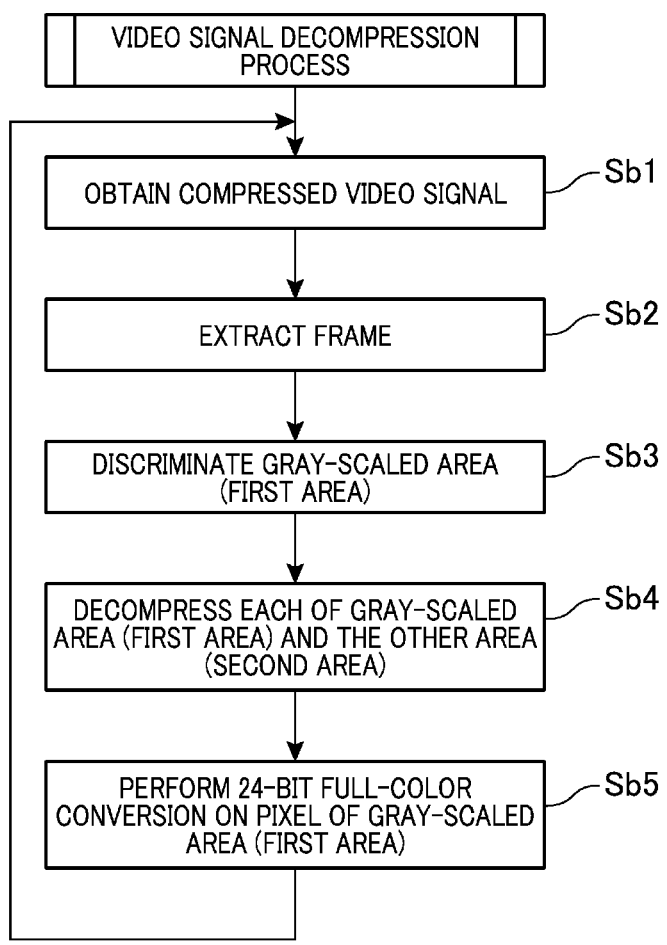
FIG. 8 is a flowchart of a video signal decompression process.

FIG. 8 is a flowchart of the video signal decompression process mentioned above performed by the extension receiving device 42.

When the extension receiving device 42 obtains, by the reception performed by the communication unit 71, the video signals A1 and A2 compressed by the extension transmission device 40 on the transmission side (step Sb1), extracts the frame Da from the video signals A1 and A2 (step Sb2), and successively decompresses each frame Da.

Specifically, first, the area discrimination unit 76A of the decompression processing unit 76 discriminates the first area Xa and the second area Xb that is an area other than the first area Xa in the frame Da (step Sb3). As described above, the first area Xa corresponds to the gray-scaled area, and in this step Sb3, the gray-scaled area is discriminated. Specifically, in a similar manner to step Sa4 in FIG. 6, in this step Sb3, the area discrimination unit 76A extracts all pixels in which the bit length of the binary data is 8 bits in the frame Da, and the area discrimination unit 76A discriminates the gray-scaled area on the basis of those pixels.

Subsequently, the decompression unit 76B of the decompression processing unit 76 decompresses the gray-scaled area (i.e., first area Xa) in the frame Da according to the algorithm used for the lossless compression scheme, and decompresses the area other than the gray-scaled area (i.e., second area Xb) according to the algorithm used for the lossy compression scheme (step Sb4).

Accordingly, the lossless compression and the lossy compression applied to the frame Da are decompressed. At this time, the gray-scaled area compressed using the lossless compression scheme, that is, the first area Xa is restored to the state before being compressed without loss, whereby loss of information or deterioration in visibility do not occur in the first area Xa.

Next, the full-color processing unit 77 of the video signal decompression unit 73 performs 24-bit full-color conversion on the gray-scaled area in the frame Da (step Sb5). Specifically, the full-color processing unit 77 scans each pixel of the frame Da, and each time it detects a pixel in which the bit length of the binary data is 8 bits, converts the binary data of the pixel from the 8-bit grayscale to the 24-bit full color in which 8 bits are allocated to each RGB color.

Accordingly, the entire frame Da is restored to an image in the 24-bit full color format, and as a result, the video signals A1 and A2 that have been compressed at the time of reception are restored as video signals A1 and A2 in the DVI format.

The extension receiving device 42 repeats the processing of steps Sb1 to Sb5 as long as the video signals A1 and A2 are received, and sequentially outputs the restored video signals A1 and A2 to the image inspection monitor 32 and the reference information monitor 34. Then, the restored video signals A1 and A2 are output to the image inspection monitor 32 and the reference information monitor 34, whereby the image inspection screen 50 and the reference information screen are displayed on the respective image inspection monitor 32 and the reference information monitor 34.

In the image inspection screen 50 and the reference information screen displayed on the image inspection monitor 32 and the reference information monitor 34, the portion to display the medical image 13 (e.g., medical image display area 51) is displayed as the state that has been output from the image inspection apparatus 3 without causing loss of information or deterioration in visibility. Therefore, the medical radiographer, the doctor, and the like can correctly perform image inspection on the basis of the image inspection screen 50 and the reference information screen.

According to the embodiment described above, the following effects can be exerted.

In the video signal transmission system 1 described above, the extension transmission device 40 includes the video signal compression unit 62 that compresses the video signals A1 and A2, and the video signal compression unit 62 compresses, in each frame Da of the video signals A1 and A2, the second area Xb for displaying information other than the medical image 13 at a compression rate higher than the compression rate used in the compression performed on the first area Xa.

As a result, the compression rate of each frame Da of the video signals A1 and A2 can be enhanced while loss of information and deterioration in visibility due to the compression in the first area Xa for displaying the medical image 13 are suppressed, thereby reducing the data volume of the video signals A1 and A2. The video signals A1 and A2 can be thus appropriately transmitted via the communication network N while the communication load is suppressed.

In the video signal transmission system 1 described above, the video signal compression unit 62 compresses, in each frame Da of the video signals A1 and A2, the first area Xa for displaying the medical image 13 using the lossless compression scheme, and compresses the second area Xb other than the first area Xa using the lossy compression scheme with a compression rate higher than that of the lossless compression scheme.

Accordingly, the compression rate of the frame Da is enhanced compared with the compression using only the lossless compression scheme, and loss of information and the deterioration in visibility due to the compression do not occur in the first area Xa.

In the video signal transmission system 1 described above, each frame Da of the video signals A1 and A2 is a signal having the 24-bit binary data in which each pixel indicates a plurality of RGB colors. The video signal compression unit 62 of the extension transmission device 40 converts the binary data of each pixel of the first area Xa in each frame Da into the grayscale of 8 bits smaller than 24 bits.

Since the first area Xa is an area displaying the medical image 13 originally in the grayscale format, the image quality of the frame Da is not substantially affected even when the first area Xa is gray-scaled. In addition, the bit length of the binary data of each pixel in the first area Xa decreases from 24 bits to 8 bits, whereby the data volume of the first area Xa is reduced to one third, and the data volume of the frame Da can be further reduced.

In the video signal transmission system 1 described above, the video signal compression unit 62 of the extension transmission device 40 converts the first area Xa in each frame Da of the video signals A1 and A2 into grayscale, and then compresses it using the lossless compression scheme.

Accordingly, the video signal compression unit 62 can discriminate, by extracting the pixels converted into grayscale, the area (i.e., first area Xa) to be compressed using the lossless compression scheme in the frame Da, whereby it is not necessary to, for example, separately record information defining the range of the first area Xa.

In the video signal transmission system 1 described above, the video signal compression unit 62 of the extension transmission device 40 discriminates the first area Xa on the basis of the color indicated by the binary data of the pixel in each frame Da of the video signals A1 and A2.

Accordingly, the first area Xa displaying the medical image 13 originally in the grayscale format can be easily and reliably discriminated without missing the range of the medical image 13.

In the video signal transmission system 1 described above, the extension transmission device 40 obtains the audio signal A3 output from the image inspection apparatus 3 that is the output source of the video signals A1 and A2, and transmits the audio signal A3 to the transmission destination of the video signals A1 and A2 having been compressed.

Accordingly, the audio signal A3 output from the image inspection apparatus 3 can also be transmitted to the extension receiving device 42 that is the transmission destination of the video signals A1 and A2.

In the video signal transmission system 1 described above, the extension transmission device 40 receives, via the communication network N, the input device signal A4 output from the input device 30, and outputs the input device signal A4 to the image inspection apparatus 3 that is the output source of the video signals A1 and A2.

Accordingly, the user can give, using the input device 30, an instruction and information to the image inspection apparatus 3 via the communication network N from the operation room R3, the image interpretation room R4, or the like.

In the video signal transmission system 1 described above, the extension receiving device 42 on the receiving side includes the video signal decompression unit 73 that decompresses the video signals A1 and A2 transmitted from the extension transmission device 40 on the transmission side, and the first video signal I/F unit 74A and the second video signal I/F unit 74B that output, to the image inspection monitor 32 and the reference information monitor 34, the video signals A1 and A2 having been decompressed, respectively.

Accordingly, the video signals A1 and A2 in the compressed state transmitted from the extension transmission device 40 are restored on the receiving side, and the image inspection screen 50 and the reference information screen can be displayed on the image inspection monitor 32 and the reference information monitor 34 without causing loss of information or deterioration in visibility in the area displaying the medical image 13.

Note that the embodiment described above is merely an exemplary aspect of the present invention, and modification and application can be optionally made without departing from the gist of the present invention.

Although the X-ray fluoroscopic imaging apparatus 2 is exemplified as a medical imaging apparatus for capturing the medical image 13 in the embodiment described above, it is not limited thereto. That is, the medical imaging apparatus may be an optional apparatus, such as an X-ray general imaging apparatus, a radio isotope (RI) apparatus, a computed radiography (CR) apparatus, an ultrasonic imaging apparatus using ultrasonic waves, and a magnetic resonance imaging (MRI) apparatus using magnetism, as long as it is an apparatus that captures the medical image 13.

Although the case where a dynamic image of the uninspected medical image 13A is displayed in the medical image display area 51 of the image inspection screen 50 has been exemplified in the embodiment described above, it is not limited thereto, and a still image may be displayed.

In the embodiment described above, each extension receiving device 42 may receive voice input from a microphone, transmit the audio signal of the microphone to another extension receiving device 42 via the communication network N, and the other extension receiving device 42 may output the voice of the microphone from the speaker 36.

Accordingly, the users can exchange voices with each other in different rooms such as the operation room R3 and the image interpretation room R4.

Note that the extension transmission device 40 may receive the audio signal of the microphone transmitted by the extension receiving device 42 to output it to the image inspection apparatus 3 in a similar manner to the input device signal A4.

Although the case where the video signal transmission system 1 transmits the video signals A1 and A2 output from the image inspection apparatus 3 has been exemplified in the embodiment described above, it is not limited thereto.

For example, the video signal transmission system 1 can be used for transmission of video signals of various display screens for displaying the medical image 13 in the medical image system 25 (FIG. 1).

REFERENCE SIGNS LIST

1 video signal transmission system
2 X-ray fluoroscopic imaging apparatus (medical imaging apparatus)
13 medical image
13A uninspected medical image
13B inspected medical image
25 medical image system
30 input device
32 image inspection monitor (display device)
34 reference information monitor (display device)
36 speaker
40 extension transmission device (video signal compression processor)
42 extension receiving device (video signal decompression processor)
50 image inspection screen (display screen)
61, 75 signal acquisition unit
61A, 74A first video signal I/F unit
61B, 74B second video signal I/F unit
61C, 74C audio signal I/F unit
62 video signal compression unit
63R, 71R receiving unit
63T, 71T transmitting unit
64, 74 signal output unit
64A, 75A input device I/F unit
67 grayscale processing unit
68 compression processing unit
68A, 76A area discrimination unit
68B compression unit
73 video signal decompression unit
76 decompression processing unit
76B decompression unit
77 full-color processing unit
A1, A2 video signal
A3 audio signal
A4 input device signal
Da frame
N communication network
Xa first area
Xb second area

What is claimed is:

1. A video signal compression processor, comprising:
   a video signal compression circuit that compresses a video signal for displaying, on a display device, a display screen including a first area for displaying a medical image captured by a medical imaging apparatus and a second area for displaying information other than the medical image; and
   a transmitting circuit that transmits, via a communication network, the video signal having been compressed,
   wherein the video signal compression circuit compresses, in each frame of the video signal, the second area of the display screen at a compression rate higher than a compression rate of compression performed on the first area,
   wherein the video signal compression circuit compresses, in each frame of the video signal, the first area of the display screen using a lossless compression scheme, and compresses the second area using a lossy compression scheme with a compression rate higher than a compression rate of the lossless compression scheme, and
   wherein the second area does not include the medical image.

2. The video signal compression processor according to claim 1, wherein
   each frame of the video signal is a signal having binary data of a predetermined bit length in which each pixel indicates a plurality of colors, and
   the video signal compression circuit converts, in each frame of the video signal, the binary data of each pixel in the first area of the display screen into grayscale of a bit length smaller than the predetermined bit length.

3. The video signal compression processor according to claim 2, wherein the video signal compression circuit converts, in each frame of the video signal, the first area of the display screen into the grayscale, and then compresses the first area.

4. The video signal compression processor according to claim 1, wherein
the video signal compression circuit discriminates the first area of the display screen on the basis of a color indicated by a pixel in each frame of the video signal.

5. The video signal compression processor according to claim 1, comprising:
a signal acquisition circuit that obtains an audio signal output by an output source of the video signal, wherein
the transmitting circuit transmits the audio signal to a transmission destination of the video signal having been compressed.

6. The video signal compression processor according to claim 1, comprising:
a receiving circuit that receives, via the communication network, an input device signal output from an input device; and
a signal output circuit that outputs the input device signal having been received to an output source of the video signal.

7. A video signal decompression processor, comprising:
a video signal decompression circuit that decompresses a video signal transmitted by a video signal compression processor; and
a video signal output circuit that outputs, to a display device, the video signal having been decompressed,
wherein the video signal compression processor comprises:
a video signal compression circuit that compresses the video signal for displaying, on the display device, a display screen including a first area for displaying a medical image captured by a medical imaging apparatus and a second area for displaying information other than the medical image; and
a transmitting circuit that transmits, via a communication network, the video signal having been compressed,
wherein the video signal compression circuit compresses, in each frame of the video signal, the second area of the display screen at a compression rate higher than a compression rate of compression performed on the first area, without extracting the second area from the each frame of the video signal,
wherein the video signal compression circuit compresses, in each frame of the video signal, the first area of the display screen using a lossless compression scheme, and compresses the second area using a lossy compression scheme with a compression rate higher than a compression rate of the lossless compression scheme, and
wherein the second area does not include the medical image.

8. A video signal transmission system, comprising:
a video signal compression processor that includes a video signal compression circuit for compressing a video signal for displaying, on a display device, a display screen including a first area for displaying a medical image captured by a medical imaging apparatus and a second area for displaying information other than the medical image, and a transmitting circuit for transmitting, via a communication network, the video signal having been compressed; and a video signal decompression processor that includes a video signal decompression circuit for decompressing the video signal transmitted by the video signal compression processor, and a video signal output circuit for outputting, to the display device, the video signal having been decompressed,
wherein the video signal compression circuit of the video signal compression processor compresses, in each frame of the video signal, the second area of the display screen at a compression rate higher than a compression rate of compression performed on the first area, without extracting the second area from the each frame of the video signal,
wherein the video signal compression circuit compresses, in each frame of the video signal, the first area of the display screen using a lossless compression scheme, and compresses the second area using a lossy compression scheme with a compression rate higher than a compression rate of the lossless compression scheme, and
wherein the second area does not include the medical image.

9. A method of compressing a video signal, comprising:
compressing a video signal for displaying, on a display device, a display screen including a first area for displaying a medical image captured by a medical imaging apparatus and a second area for displaying information other than the medical image; and
outputting the video signal having been compressed,
wherein in the compressing the video signal, the second area of the display screen in each frame of the video signal is compressed at a compression rate higher than a compression rate of compression performed on the first area, without the second area being extracted from the each frame of the video signal,
wherein in the compressing the video signal, in each frame of the video signal, the first area of the display screen is compressed using a lossless compression scheme, and the second area is compressed using a lossy compression scheme with a compression rate higher than a compression rate of the lossless compression scheme, and
wherein the second area does not include the medical image.

10. A method of decompressing a video signal, comprising:
decompressing a video signal having been compressed using a method of compressing the video signal; and
outputting the video signal having been decompressed to a display device,
wherein the method of compressing the video signal comprises:
compressing a video signal for displaying, on a display device, a display screen including a first area for displaying a medical image captured by a medical imaging apparatus and a second area for displaying information other than the medical image; and
outputting the video signal having been compressed,
wherein in the compressing the video signal, the second area of the display screen in each frame of the video signal is compressed at a compression rate higher than a compression rate of compression performed on the first area, without the second area being extracted from the each frame of the video signal,
wherein in the compressing the video signal, in each frame of the video signal, the first area of the display screen is compressed using a lossless compression scheme, and the second area is compressed using a lossy compression scheme with a compression rate higher than a compression rate of the lossless compression scheme, and wherein the second area does not include the medical image.

* * * * *